US010392133B2

(12) United States Patent
Blanc-Pâques (10) Patent No.: US 10,392,133 B2
(45) Date of Patent: Aug. 27, 2019

(54) METHOD FOR PLANNING THE ACQUISITION OF IMAGES OF AREAS OF THE EARTH BY A SPACECRAFT

(71) Applicant: AIRBUS DEFENCE AND SPACE SAS, Toulouse (FR)

(72) Inventor: Pierre Blanc-Pâques, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 20 days.

(21) Appl. No.: 15/748,172

(22) PCT Filed: Jul. 28, 2016

(86) PCT No.: PCT/FR2016/051963
§ 371 (c)(1),
(2) Date: Jan. 26, 2018

(87) PCT Pub. No.: WO2017/017384
PCT Pub. Date: Feb. 2, 2017

(65) Prior Publication Data
US 2018/0251239 A1 Sep. 6, 2018

(30) Foreign Application Priority Data
Jul. 28, 2015 (FR) ...................................... 15 57215

(51) Int. Cl.
*B64G 1/10* (2006.01)
*G06Q 10/06* (2012.01)
(Continued)

(52) U.S. Cl.
CPC .......... *B64G 1/1021* (2013.01); *G06Q 10/04* (2013.01); *G06Q 10/06* (2013.01); *G06T 1/0007* (2013.01);
(Continued)

(58) Field of Classification Search
CPC .......... B64G 1/1021; B64G 2001/1028; G06Q 10/04; G06Q 10/06; G06T 1/0007; G06T 7/0002; G06T 2207/30181
(Continued)

(56) References Cited

U.S. PATENT DOCUMENTS

| 8,880,246 B1* | 11/2014 | Karpenko | ................ B64G 1/24 244/158.1 |
| 2012/0046863 A1* | 2/2012 | Hope | ...................... B64G 3/00 701/531 |
| 2014/0039963 A1* | 2/2014 | Augenstein | ...... G06Q 10/06314 705/7.24 |

FOREIGN PATENT DOCUMENTS

| FR | 3 011 322 A1 | 4/2015 |
| FR | 3 011 339 A1 | 4/2015 |
| FR | 3 016 719 A1 | 7/2015 |

OTHER PUBLICATIONS

Sun et al., "Satellite mission scheduling algorithm based on GA," Proc. SPIE, Nov. 10, 2007, pp. 67950U-67950U-6, vol. 6795.
(Continued)

*Primary Examiner* — Jonathan S Lee
(74) *Attorney, Agent, or Firm* — Im IP Law; C. Andrew Im; Chai Im (57) ABSTRACT

A method for planning the acquisition of images of areas Z1, . . . , ZN of the Earth, by a spacecraft on a mission around the Earth. Each area Zi of the Earth being associated with a request Ri such that a visual accessibility time interval Ti corresponds to the area Zi. For each interval Ti, discrete acquisition opportunities for acquiring area Zi are determined such that a start date, a period of execution, a local kinematic constraint and a weight is associated with each of the discrete acquisition opportunities. The discrete acquisition opportunities for acquiring areas Zi are grouped into a set D. The discrete acquisition opportunities Di of the set D
(Continued)

are categorized by ascending start date. The kinematic compatibility between the discrete acquisition opportunities of set D is assessed. An optimal sequence of discrete acquisition opportunities is determined having a maximum weight, and being kinematically compatible.

21 Claims, 2 Drawing Sheets

(51) Int. Cl.
  *G06T 1/00* (2006.01)
  *G06T 7/00* (2017.01)
  *G06Q 10/04* (2012.01)
(52) U.S. Cl.
  CPC .... *G06T 7/0002* (2013.01); *B64G 2001/1028* (2013.01); *G06T 2207/30181* (2013.01)
(58) Field of Classification Search
  USPC .......................................................... 382/100
  See application file for complete search history.

(56) References Cited

OTHER PUBLICATIONS

Benoist et al., "Upper bounds for revenue maximization in a satellite scheduling problem," 40R, Oct. 1, 2004, pp. 235-249, vol. 2, No. 3.

* cited by examiner

METHOD FOR PLANNING THE ACQUISITION OF IMAGES OF AREAS OF THE EARTH BY A SPACECRAFT

RELATED APPLICATIONS

This application is a § 371 application from PCT/FR2016/051963 filed Jul. 28, 2016, which claims priority from French Patent Application No. 15 57215 filed Jul. 28, 2015, each of which is incorporated herein by reference in its entirety.

TECHNICAL FIELD

The present invention belongs to the field of terrestrial imaging by spacecraft, such as observation satellites, and relates more particularly to a method for planning the acquisition of images of terrestrial areas by a spacecraft or a constellation of such spacecraft. The invention is particularly advantageously, but completely non-limitingly, applicable to the case of observation satellites operating in a mode of acquiring images line by line, which mode is referred to hereinafter by the term "pushbroom" mode known to those skilled in the art.

BACKGROUND OF THE INVENTION

The terrestrial observation missions carried out by a spacecraft consist in acquiring images of terrestrial areas, i.e. areas located on the surface of the Earth, in response to requests from clients. In particular, such a spacecraft follows a traveling orbit around the Earth so as to be capable of acquiring said terrestrial areas as it passes over them for a predetermined duration. Additionally, the increase in agility of such a spacecraft allows the number of terrestrial areas that are imaged to be increased, these areas now potentially being located on either side of said orbit or else acquired at various angles over the course of multiple orbits. Thus, any instant in time along said traveling orbit corresponds to one or more opportunities for acquiring images of different terrestrial areas.

Said requests are received regularly by the spacecraft, generally daily. Currently, the requests for such acquisitions of terrestrial areas are increasing in number, since they are no longer limited just to those industrial sectors that are historically linked to the space imaging sector. For example, and non-limitingly, the agriculture sector now makes considerable use of terrestrial observations with a view to optimizing the use of agrarian areas.

Consequently, the requests to be processed by such a spacecraft are continually increasing both in terms of number and in terms of complexity, inasmuch as these requests contain highly specific constraints that are associated with the terrestrial area to be acquired, such as for example localization or light exposure conditions, or else the requirement for multiple acquisitions with a view to obtaining stereo, tri-stereo or multispectral images. In addition to this is the fact that requests can be differentiated according to their level of priority.

The management of the constraints that are associated with said requests must also be performed in parallel to the management of the operational constraints that are associated with said spacecraft, whether they be cumulative (memory size, consumed electrical power, maximum operating time of on-board instruments), or else local (minimum duration between two successive acquisitions).

It is therefore understood that the aim consisting in fulfilling a set of such requests is a very highly constrained problem for which it is necessary to plan the imaging to be performed over time, according to the orbit of said spacecraft. More broadly, such a problem comes under the category of "traveling salesman" optimization problems, which are well known for being very difficult to solve in a reasonable amount of time.

The problem is particularly critical in the case in which the user request must be fulfilled within a short timeframe. Increasing the number of satellites makes it possible to have satellite access to an area within much shorter timeframes. However, it is only possible to make full use of this capability if the acquisition plan can also be updated within short timeframes.

Although it is known that high-quality approximation solutions to such a planning problem can be provided by virtue of heuristic optimization techniques (for example greedy algorithms), their computation times are not satisfactory considering the volume of requests to be processed under operational conditions.

More recently, problem-solving techniques based on important simplification assumptions, in particular regarding the decoupled management of the local and cumulative constraints of said craft, have made it possible to provide solutions to the management of said local constraints within a reasonable amount of time, which is a first step toward completely solving said planning problem. Although some of these techniques do indeed allow cumulative constraints to be taken into account, none of them allows the acquisition of stereo, tri-stereo or multispectral images to be taken into account, in particular in the case of an observation satellite operating in pushbroom mode. As such, these techniques are limiting and not optimal with regard to the number of requests that they are able to fulfill.

SUMMARY OF THE INVENTION

The aim of the present invention is to overcome all or some of the drawbacks of the prior art, in particular those summarized above, by providing a solution that makes it possible to have a planning method which is optimum with regard to meeting local and cumulative constraints of a spacecraft and that makes it possible to take into account those terrestrial areas which have to be acquired a plurality of times or else a single time.

To this end, the invention relates to a method for planning the acquisition of images of terrestrial areas $Z_1, \ldots, Z_N$ by a spacecraft on a mission around the Earth following a predetermined traveling orbit, such as an observation satellite for example, each terrestrial area $Z_i$ being associated with a request $R_i$ such that said area $Z_i$ corresponds to a visual accessibility time period Ti along said traveling orbit, $1 \leq i \leq N$. Said method furthermore comprises the following successive steps:

- a step of determining, for each period $T_i$, discrete acquisition opportunities of area $Z_i$ such that a start date that is included in said period $T_i$, a duration of execution, a kinematic local constraint and a weight are associated with each said discrete acquisition opportunity;
- a step of grouping together the discrete acquisition opportunities of areas $Z_i$ into a set D;
- a step of ranking the discrete acquisition opportunities of the set D, the acquisition opportunities being ranked in order of increasing start date and denoted by $D^i$;

a step of evaluating the kinematic compatibility between said discrete acquisition opportunities of the set D, taken pairwise according to their respective rankings;

a step of determining an optimum sequence of discrete acquisition opportunities having a maximum weight, and being kinematically compatible.

In particular modes of implementation, the method for planning the acquisition of images of terrestrial areas includes one or more of the following features, taken individually or in all technically possible combinations.

In one particular mode of implementation, the method includes a step of taking multiple acquisition requests into account, subsequent to the step of evaluating the kinematic compatibility and prior to the step of determining an optimum sequence, wherein the respective weights of the discrete acquisition opportunities that are associated with areas $Z_i$ having to be acquired a plurality of times are updated and wherein a variable mustHit forces the chaining of said discrete acquisition opportunities to fulfill said multiple acquisition requests.

In one particular mode of implementation, the step of determining an optimum sequence includes dynamically updating a variable pathMesh storing the areas $Z_i$ that are associated with the discrete acquisition opportunities of said sequence, so as to prevent the duplication of discrete acquisition opportunities for areas having to be acquired a single time.

In one particular mode of implementation, the step of determining an optimum sequence includes, for each discrete acquisition opportunity $D^i$ of the set D, a partial selection of discrete acquisition opportunities preceding $D^i$ in D, and which are kinematically compatible with $D^i$, from all of the discrete acquisition opportunities preceding $D^i$ in D, and which are kinematically compatible with $D^i$.

In one particular mode of implementation, the method includes a step of verifying that at least one cumulative constraint imposed on said spacecraft is respected, said verification step being subsequent to the step of determining an optimum sequence.

In one particular mode of implementation, said at least one cumulative constraint includes a memory size constraint.

In one particular mode of implementation, said at least one cumulative constraint includes a consumed electrical power constraint.

In one particular mode of implementation, said at least one cumulative constraint includes a maximum operating time constraint for instruments on board said craft.

In one particular mode of implementation, the step of verifying that cumulative constraints are respected includes dynamically updating said optimum sequence by removing discrete acquisition opportunities when said cumulative constraints are not met.

In one particular mode of implementation, the start dates of the discrete acquisition opportunities of each period $T_i$ are sampled over time according to a constant time interval.

In one particular mode of implementation, the respective time intervals of the periods $T_1, \ldots, T_N$ are equal to one another.

In one particular mode of implementation, the respective time intervals of at least two periods $T_i$ and $T_j$ are different.

In one particular mode of implementation, the time interval of each period $T_i$ is adjusted such that said period $T_i$ is associated with 20 discrete acquisition opportunities.

In one particular mode of implementation, the kinematic local constraint of a discrete acquisition opportunity includes a setpoint for the attitude of said spacecraft at the start and at the end of said discrete acquisition opportunity.

In one particular mode of implementation, the weight of each discrete acquisition opportunity that is associated with an area $Z_i$ depends on the priority of the request $R_i$ that is associated with said area $Z_i$.

In one particular mode of implementation, each area $Z_i$ is associated with a quality criterion $w_i$ that is dependent on the geometric features of said area $Z_i$ as well as on the meteorological conditions that are forecast for the visual accessibility time period Ti.

In one particular mode of implementation, the weight of each discrete acquisition opportunity that is associated with an area $Z_i$ depends on the priority of the request $R_i$ so as to be a vector, the sole non-zero component of which is equal to the quality criterion $w_i$, the position of said non-zero component in said vector depending on the priority of said request $R_i$.

In one particular mode of implementation, said non-zero component depends on the quality criterion $w_i$ and on an acquisition advantage criterion that is associated with said discrete acquisition opportunity.

In one particular mode of implementation, the step of determining an optimum sequence includes a comparison of the respective weights of the discrete acquisition opportunities that are kinematically compatible with one another.

In one particular mode of implementation, the method includes a step of aggregating terrestrial areas, prior to the step of determining discrete acquisition opportunities.

In one particular mode of implementation, said spacecraft is an observation satellite operating in pushbroom mode.

PRESENTATION OF THE FIGURES

The features and advantages of the invention will be better appreciated by virtue of the following description, which description discloses the features of the invention by way of preferred modes of implementation, which are in no way limiting.

The description makes reference to the appended figures, which show.

DETAILED DESCRIPTION OF ONE EMBODIMENT OF THE INVENTION

The present invention belongs to the field of planning the acquisition of images of terrestrial areas by a spacecraft on a mission around the Earth following a predetermined traveling orbit.

Figure 1:
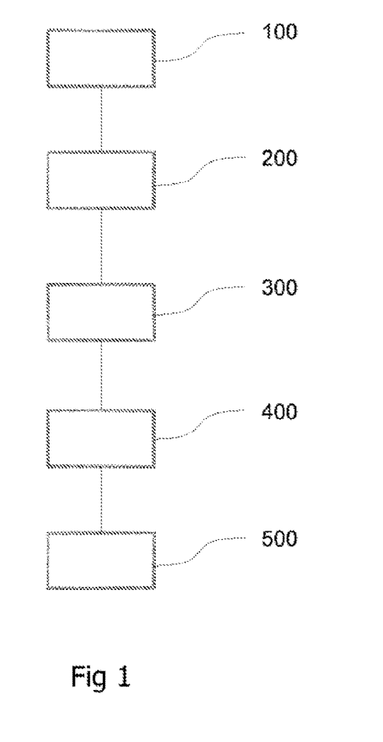
FIG. 1: a representation of a flowchart of one exemplary implementation of a method for planning the acquisition of images of terrestrial areas $Z_1, \ldots, Z_N$ by a spacecraft.

FIG. 1 shows a flowchart of one exemplary implementation of a method for planning the acquisition of images of terrestrial areas $Z_1, \ldots, Z_N$ by a spacecraft.

The term "acquisition of images" is understood here to mean measuring electromagnetic radiation received from said terrestrial areas $Z_1, \ldots, Z_N$. For this purpose, the spacecraft includes an optical system that is intended to carry out a plurality of image acquisition operations, said optical system additionally including sensors that are suitable for measuring said electromagnetic radiation. Said images are ultimately converted into a digital format and stored within a limited-capacity memory on board said spacecraft.

The aim of the remainder of the description is more specifically, but non-limitingly, a method for planning the acquisition of images of terrestrial areas by an agile observation satellite in a traveling orbit (LEO or MEO, "low Earth orbit" and "medium Earth orbit", respectively). For example, said agile observation satellite follows a near-polar heliosynchronous orbit at constant altitude. It includes an instrument that is suitable for acquiring images in pushbroom mode, line by line in various directions of acquisition.

However, according to other examples (not shown), there is nothing to rule out considering other types of spacecraft (space shuttles, probes, etc.) that are suitable for acquiring images of terrestrial areas, as well as other types of instruments or other image acquisition modes, for example using matrix detectors in "step and stare" mode.

The terrestrial areas $Z_1, \ldots, Z_N$ are respective finite areas on the ground that are potentially contiguous and intersect with the imaging swath of said observation satellite. The agility of the satellite allows the acquired terrestrial areas to be positioned both along the projection of said traveling orbit on the surface of the Earth and on either side of this projection on the surface of the Earth.

In the remainder of the description, each terrestrial area $Z_i$ is associated with a request $R_i$ transmitted by a user. Each request $R_i$ may itself be associated with various parameters:

a priority $p_i$, $p_i$ being for example a natural integer, which characterizes the need to fulfil this request $R_i$ before other potential requests. Each priority $p_i$ depends on multiple factors such as for example the importance and the cost of the request $R_i$ on which it depends, acquisition constraints that depend on multiple factors, such as for example the attitude of the satellite (which determines the orientation of the sighting direction), or else the meteorological conditions that are required for a good quality acquisition and that must be met at the times at which the satellite is potentially able to acquire the area $Z_i$ associated with said request $R_i$, an acquisition type (mono, stereo, tri-stereo). Specifically, some areas $Z_i$ have to be acquired a plurality of times, potentially at a different angle of acquisition such as for example in the case of stereo or tri-stereo acquisition.

It should be noted that in general, that is to say at the time at which a request $R_i$ is signaled by a user, the area $Z_i$ associated with said request $R_i$ is of any shape. For this reason, for the purpose of operational optimization, an image acquisition campaign by the satellite is generally preceded by a shaping step consisting in dividing said area $Z_i$ into elementary zones that are suitable for being acquired by said satellite. For example, in the case of imaging in the pushbroom mode, said zones Zi are divided into strips the width of which is smaller than or equal to that of the imaging swath of the satellite.

For the remainder of the description, it is assumed that the areas $Z_i$ associated with the requests $R_i$ have respective shapes that are suitable for being acquired by the optical system of said satellite. Stated otherwise, said shaping step is either unnecessary considering the respective initial shapes of said areas $Z_i$, or is assumed to have already been carried out.

Furthermore, each terrestrial area $Z_i$ has a corresponding visual accessibility time period $T_i$ along said traveling orbit. Said period $T_i$ includes a start date along with an end date, and corresponds to a time duration for which the satellite is able to acquire an image of the area $Z_i$ while observing the acquisition constraints as well as the acquisition type of the request $R_i$ with which said area $Z_i$ is associated.

For the rest of the description, the convention that the components of a vector are read from left to right while being indexed from 1 is also adopted. Thus, a vector V having N components is denoted by $V=(V^1, V^2, \ldots, V^N)$. Similarly, an element positioned on the $i^{th}$ row and $j^{th}$ column of a matrix M is denoted by $M^{i,j}$.

The method for planning the acquisition of images includes multiple successive steps. According to its general principle, said method consists in first determining acquisition sequences including points along the traveling orbit of the satellite, such that, by carrying out image acquisitions at the respective points of said sequences, the greatest number of user requests are fulfilled. Next, the aim of said method is to determine which among said acquisition sequences meets an optimality criterion defined below as well as constraints that are inherent to the operation of said satellite.

For this purpose, the method includes, in a first stage, a step 100 of determining, for each period $T_i$, discrete acquisition opportunities $a_i^1$, $a_i^2$, etc. for the area $Z_i$ such that a start date that is included in said period $T_i$, a duration of execution, a kinematic local constraint and a weight are associated with each said discrete acquisition opportunity.

A discrete acquisition opportunity $a_i^j$ is a point along said traveling orbit that denotes the possibility of the satellite acquiring an image of an area $Z_i$, from a start date and for a duration of execution that are comprised in the period $T_i$ of said area $Z_i$, such that the acquisition constraints as well as the acquisition type of the request $R_i$ that is associated with this area $Z_i$ are observed.

In the remainder of the description, an acquisition sequence denotes a series of discrete acquisition opportunities.

A period $T_i$ includes one or more discrete acquisition opportunities, which discretize the period according to their respective start dates. Specifically, the agility of the satellite makes it possible for an area $Z_i$ to be acquired at separate times in its period $T_i$.

In one particular mode of implementation of step 100, the start dates of the discrete acquisition opportunities of each period $T_i$ are sampled over time according to a constant time interval. It should be noted that the shorter the length chosen for said constant time interval, the greater the number of acquisition opportunities within each period $T_i$, thus increasing the number of possible acquisition sequences. Conversely, a short time interval increases the computational complexity of the method.

In one particular mode of implementation of step 100, the respective time intervals of at least two periods $T_i$ and $T_j$ are different. Such a configuration is advantageous when, for example, the respective priorities of the requests $R_i$ and $R_j$ that are associated with said periods $T_i$ and $T_j$ are different. Specifically, one means for fulfilling a high-priority request consists in associating said request with a large number of discrete acquisition opportunities so as to increase the number of points along the orbit at which the satellite carries out acquisitions of the area associated with said request; stated otherwise, the higher the priority of a request, the more advantageous it is to finely discretize the accessibility period associated with this request by means of a short time interval, so as to have a large number of discrete acquisition opportunities within said accessibility period.

In one particular mode of implementation of step 100, the respective time intervals of the periods $T_1, \ldots, T_N$ are equal to one another. In this way, a single time interval is chosen, which is advantageous in terms of computing time when the respective priorities of the requests $R_1, \ldots, R_N$ that are associated with the periods $T_1, \ldots, T_N$ are all identical.

In one particular mode of implementation of step 100, the time interval of each period $T_i$ is adjusted such that said period $T_i$ is associated with a predefined number of discrete acquisitions. For example, a number of discrete acquisitions that is equal to 20 is advantageous insofar as practice shows that it strikes a good compromise between the optimization of the method from the point of view of computing time and the possibility of constructing a sufficient number of acquisition sequences with a view to best fulfilling a large number of requests.

Furthermore, the duration of execution corresponds to the time required by the optical system of the satellite for acquisition, assuming that the attitude of said satellite allows it from said start date of the acquisition. Thus, the duration of execution of a discrete acquisition opportunity does not comprise the time required for modifying the attitude of the satellite so that the optical system of the satellite is configured to carry out said acquisition or else another, later, potential acquisition. By way of completely nonlimiting example, corresponding to the most commonly used configurations, the execution time of an acquisition opportunity is comprised between 5 seconds and 15 seconds.

The kinematic local constraint of a discrete acquisition opportunity corresponds to the configuration in which the satellite must find itself, and hence the orientation of the sighting axis of the instrument, at the start and at the end of a discrete acquisition opportunity in order to fulfill the request with which said discrete acquisition opportunity is associated.

For example, the kinematic local constraint of a discrete acquisition opportunity includes a setpoint for the attitude of said spacecraft at the start and at the end of said discrete acquisition opportunity. The term "attitude setpoint" is understood here to mean the orientation of the satellite during an acquisition in order to fulfil the request associated with said acquisition.

The weight $c[a_i^j]$ of a discrete acquisition opportunity $a_i^j$ corresponds to a general measurement of the advantage of acquiring a terrestrial area in said discrete acquisition opportunity with respect to the set of requests received by the satellite.

For example, the weight of each discrete acquisition opportunity associated with an area $Z_i$ depends on the priority $p_i$ of the request $R_i$ that is associated with said area $Z_i$, such that the higher said priority, the greater the respective weights of said discrete acquisition opportunities.

The weight of a discrete acquisition opportunity also advantageously relates to features of the terrestrial area with which said opportunity is associated. Thus, in one particular mode of implementation of step 100, each area $Z_i$ is associated with a quality criterion $w[Z_i]$ that is dependent on the geometric features of said area $Z_i$ as well as on the meteorological conditions that are forecast for the visual accessibility time period Ti. Said quality criterion $w[Z_i]$ is a scalar quantity characterizing, for example, the fact that the area $Z_i$ is of small size and hence easier to acquire than an area of larger size, but also that the meteorological conditions encountered during the visual accessibility time period $T_i$ associated with $Z_i$ are substantially identical to those required by the acquisition constraints of the request linked to said period $T_i$.

In one particular mode of implementation of step 100, the weight of each discrete acquisition opportunity that is associated with an area $Z_i$ depends on the priority $p_i$ of the request $R_i$ so as to be a vector, the sole non-zero component of which is equal to said quality criterion $w[Z_i]$, the position of said non-zero component in said vector being the priority $p_i$ of said request $R_i$. In this mode of implementation, the size of said vector is equal to the number of separate priorities used to rank the requests received by the satellite during a mission. Furthermore, the convention that a priority $p_i$ is of greater importance than another priority $p_j$ if and only if $p_i < p_j$ is adopted. For example, a discrete acquisition opportunity $a_i^j$ for an area $Z_i$ having a quality criterion $w[Z_i]$ and being associated with a request $R_i$ having a priority $p_i$ that is equal to 2, from a set of requests having priorities from 1 to 4, has a weight of $$c[a_i^j] = (c^1[a_i^j], c^2[a_i^j], c^3[a_i^j], c^4[a_i^j]) = (0, w[Z_i], 0, 0).$$

Such a representation of the respective weights of the discrete acquisition opportunities is advantageous since it makes it possible to compare the weights with one another by means of a natural order relationship denoted by $\succ$ operating in the following way: $c[a] \succ c[b]$ in the sense that the weight of a discrete acquisition opportunity a is greater than the weight of a discrete acquisition opportunity b if and only if $$\{c^1[a] > c^1[b]\} \vee \{(c^1[a] = c^1[b]) \wedge (c^2[a] > c^2[b])\} \ldots,$$

The operators $\wedge$ and $\vee$ represent the Boolean operators "and" and "or", respectively, and the operator $>$ is the conventional operator for comparing scalars. It should be noted that the order relationship $\succ$ operates by comparing vectors component by component, and is thus a lexicographical order.

Such a representation is also advantageous since it makes it possible to naturally define the weight of an acquisition sequence including a plurality of discrete acquisition opportunities as the sum of the weights of said discrete acquisition opportunities, the vectors being summed component by component.

In one particular mode of implementation of step 100, said non-zero component of the weight of a discrete acquisition opportunity $a_i^j$ depends on the quality criterion $w[Z_i]$ and on an acquisition advantage criterion $w[a_i^j]$ that is associated with said discrete acquisition opportunity $a_i^j$. Said acquisition advantage criterion $w[a_i^j]$ is a scalar that measures the advantage of acquiring more particularly the opportunity $a_i^j$ rather than another opportunity that is itself also associated with the same area $Z_i$. For example, and completely non-limitingly, the acquisition advantage criterion depends on the angle of acquisition of each opportunity for one and the same area $Z_i$. Furthermore, in this mode of implementation, the weight of a discrete acquisition opportunity is updated such that, taking again the above example:

$$c[a_i^j] = (0, w[Z_i] + w[a_i^j], 0, 0).$$

Proceeding in such a manner is advantageous inasmuch as the weight of a discrete acquisition opportunity takes into account both the features of the area and the request with which said discrete acquisition opportunity is associated, and also the differences between the discrete acquisition opportunities of one and the same area. Thus, the weight c[$a_i^j$] exhaustively measures the advantage and the variability existing between each discrete acquisition opportunity.

The method next includes a step 200 of grouping together the discrete acquisition opportunities for the various areas $Z_i$ into a set D.

Each element of the set D is a discrete acquisition opportunity with which a start date, a duration of execution, a kinematic local constraint and a weight are associated. The set D, such as described in this step 200, thus groups together all of the opportunities that are liable to form part of one or multiple acquisition sequences with a view to fulfilling a maximum number of requests.

The method next includes a step 300 of ranking the discrete acquisition opportunities of the set D in order of increasing start date.

Said step 300 therefore consists in ordering the elements of the set D. It is possible to rank the elements of D according to other features of the discrete acquisition opportunities. For example, these opportunities may be ranked in order of increasing weight (in the sense of the order relationship $\succ$ ), in order of increasing duration of execution or else according to the requests with which they are associated. However, in the present mode of implementation, the choice is advantageously made to rank them in order of increasing start date for reasons explained below.

It should be noted that any subset of the set D thus sorted constitutes a potential acquisition sequence, i.e. a series of discrete acquisition opportunities observing the chronology of the motion of the satellite along its traveling orbit. It should however be ensured that the satellite is actually able to execute the discrete acquisition opportunities of said potential acquisition sequence one after the other.

For this purpose, the method next includes a step 400 of evaluating the kinematic compatibility between said discrete acquisition opportunities of the set D, taken pairwise according to their respective rankings.

The term "kinematic compatibility" is understood here to mean that two discrete acquisition opportunities $D^i$ and $D^j$ of the set D, such that said opportunity $D^i$ has a start date prior to the start date of said opportunity $D^j$ (hence such that i<j), can be concatenated by the satellite along its orbit. This is theoretically possible when the maneuvering time required by the satellite to move from the opportunity $D^i$ to the opportunity $D^j$ is shorter than the duration separating the end date of the opportunity $D^i$ from the start date of the opportunity $D^j$.

By extension, an acquisition sequence A that is a subset of the set D is said to be kinematically compatible when its elements are kinematically compatible pairwise, i.e. when $A^j$ is kinematically compatible with $A^{i+1}$.

Conventionally, the elements of the set D may be seen as the vertices of a graph G, these vertices being linked to one another by edges when they are kinematically compatible with one another. The structure of the set D, obtained upon completion of step 300, advantageously determines the structure of the graph G in as much as:
- the ranking of the elements of D in order of increasing start date provides the edges of the graph G with a natural orientation in the direction of increasing time: the graph G is thus oriented;
- an opportunity $D^i$ is not kinematically compatible with a discrete acquisition opportunity $D^j$ having a start date that is prior to that of said opportunity $D^i$ (hence such that i>j). This amounts to stating that the elements of any kinematically compatible acquisition sequence are distinct pairwise. This guarantees the impossibility of the satellite passing over the same site along its orbit twice: the graph G is therefore also acyclic.

Consequently, it is understood that seeking to plan the acquisition of images of terrestrial areas amounts to searching for kinematically compatible acquisition sequences within said graph G. More particularly, with a view to fulfilling the largest number of requests possible, this amounts to searching for a kinematically compatible acquisition sequence having the greatest weight within the graph G. In this it is an optimization problem, also known as a "longest path problem".

The fact that the graph G is an acyclic oriented graph is advantageous inasmuch as it is known that in this case said optimization problem is of polynomial complexity in terms of the number of vertices of the graph G, whereas it is of exponential complexity for an unspecified graph.

In the present mode of implementation, the graph G is represented by means of a square matrix M containing Booleans, referred to as an adjacency matrix, for which the term located on the row i and on the column j is:
$M^{i,j}=1$ if $D^i$ and $D^j$ are kinematically compatible, or
else $M^{i,j}=0$.

The conditions for compatibility between two discrete acquisition opportunities imply that M is a strictly upper triangular matrix.

It should be noted that the implementation of steps 100 to 400 is preferably carried out on the ground, and upstream of the observation mission of the satellite, i.e. potentially long before solving the optimization problem. Such an implementation is advantageous inasmuch as the tasks carried out in steps 100 to 400, and more particularly that of determining the discrete acquisition opportunities in step 100 and that of determining the graph G in step 400, can easily be executed by computing means according to a parallel programming scheme, thus allowing time to be saved. Furthermore, a first implementation of steps 100 to 400 advantageously makes it possible to avoid having to completely re-determine the graph G when it is desired for example to include, on the fly, an additional request in the mission plan of the satellite, the graph G instead being quickly and easily updated. In the same way, priorities and/or quality criteria for terrestrial areas and/or weights of discrete acquisition opportunities may be updated at the last minute before solving the optimization problem.

In a step 500, subsequent to step 400, an optimum sequence of discrete acquisition opportunities having a maximum weight, and being kinematically compatible, is determined.

Said optimum sequence is searched for within the graph G by traversing the portion located above the diagonal of the matrix M according to a longest path computing method, and provides a theoretical acquisition plan followed by the satellite over the course of its observation mission.

This is achieved in two stages. In a first stage, for each discrete acquisition opportunity $D^i$ of the set D, an objective weight obj($D^i$) is determined, which is the maximum weight of the kinematically compatible sequences leading to said discrete acquisition opportunity $D^i$. To achieve this, a set P($D^i$) of all of the discrete acquisition opportunities preceding $D^i$ in the set D, and which are kinematically compatible with $D^i$, is introduced. The objective weight obj($D^i$) is then equal to the weight of $D^i$ to which the maximum of the objective weights of the discrete acquisition opportunities of P($D^i$) is added, i.e.

$$obj(D^i) = c[D^i] + \max_{s \in P(D^i)} (obj(s)).$$

By assuming henceforth that the cardinality of the set D is $\Omega(D)$, and by introducing a variable previous($D^i$) that stores the discrete acquisition opportunity of the set $P(D^i)$ maximizing the weight of the optimum sequence leading to $D^i$, the objective weight of all of the elements of the set D is determined dynamically by means of a first algorithm written as:

```
For i ranging from 1 to Ω(D): obj(D^i) = c[D^i] EndFor;
For i ranging from 1 to Ω(D): previous(D^i) = −1 EndFor;
For i ranging from 1 to Ω(D):
    For j ranging from (i+1) to Ω(D):
        If M^i,j = 1:
            If obj(D^i) + c[D^j] > obj(D^j):
                previous(D^j) = D^i;
                obj(D^j) = obj(D^i) + c[D^j];
            EndIf;
        EndIf;
    EndFor;
EndFor;
```

It should be noted that searching for the optimum sequence using the longest path computing method, such as presented in the first algorithm, is advantageously suited to the fact that the discrete acquisition opportunities of D are ranked in order of increasing start date in step 300. Specifically, such a ranking corresponds to a topological order on the graph G, which facilitates the arrangement of the sequential steps of said first algorithm.

In a second stage, said optimum sequence is determined by selecting the discrete acquisition opportunity having the maximum objective weight among the discrete acquisition opportunities of D, then by iteratively going back through the predecessors of said opportunity that has the maximum objective weight by means of the information stored in the variable previous.

As mentioned above, the ranking of the discrete acquisition opportunities of D advantageously provides a topological order to the graph G, which is consequently an acyclic oriented graph, and hence any kinematically compatible sequence obtained as output of step 500 is optimal in the sense of weight maximality.

In one particular mode of implementation of the method, the step 500 includes, for each discrete acquisition opportunity $D^i$ of the set D, a partial selection of discrete acquisition opportunities preceding $D^i$ in the set D, and which are kinematically compatible with $D^i$, from all of the discrete acquisition opportunities preceding $D^i$ in the set D, and which are kinematically compatible with $D^i$.

Proceeding in such a manner amounts to restricting the set $P(D^i)$ for each discrete acquisition opportunity $D^i$ of the set D. Thus, said set $P(D^i)$ may advantageously be replaced by a set $P_c(D^i)$ defined as a subset thereof, and including the discrete acquisition opportunities preceding $D^i$ in the set D, which are kinematically compatible with $D^i$ as well as close to $D^i$. The term "close to $D^i$" is understood here to mean that the elements of $P_c(D^i)$ respectively occupy a position in D such that the difference between this position and that of $D^i$ remains bounded by a predefined constant.

Consequently, the objective weight $obj(D^i)$ is obtained by the formula $$obj(D^i) = c[D^i] + \max_{s \in P(D^i)} (obj(s)).$$

For this purpose, a variable maxNextVertex($D^i$) is introduced, which variable contains, for each acquisition opportunity $D^i$, the maximum number of vertices of the graph G that are visited during the search for the optimum sequence. The scalar maxNextVertex($D^i$) thus constitutes an upper bound of the cardinality of the set $P_c(D^i)$. Consequently, the first algorithm becomes:

```
For i ranging from 1 to Ω(D): obj(D^i) = c[D^i] EndFor;
For i ranging from 1 to Ω(D): previous(D^i) = −1 EndFor;
For i ranging from 1 to Ω(D):
    For j ranging from (i+1) to maxNextVertex(D^i):
        If M^i,j = 1:
            If obj(D^i) + c[D^j] > obj(D^j):
                previous(D^j) = D^i;
                obj(D^j) = obj(D^i) + c[D^j];
            EndIf;
        EndIf;
    EndFor;
EndFor;
```

Limiting the set $P(D^i)$ to the set $P_c(D^i)$ is advantageous since the exploration of the vertices of G using the longest path computing method is shortened in terms of computing time. For example, and completely non-limitingly, when the set $P_c(D^i)$ contains only discrete acquisition opportunities separated by 60 seconds at most of $D^i$ along the traveling orbit, the computing time is decreased by 60% to 70% and the optimum sequence remains unchanged with respect to the case in which $P_c(D^i)$ is not used.

Figure 2:
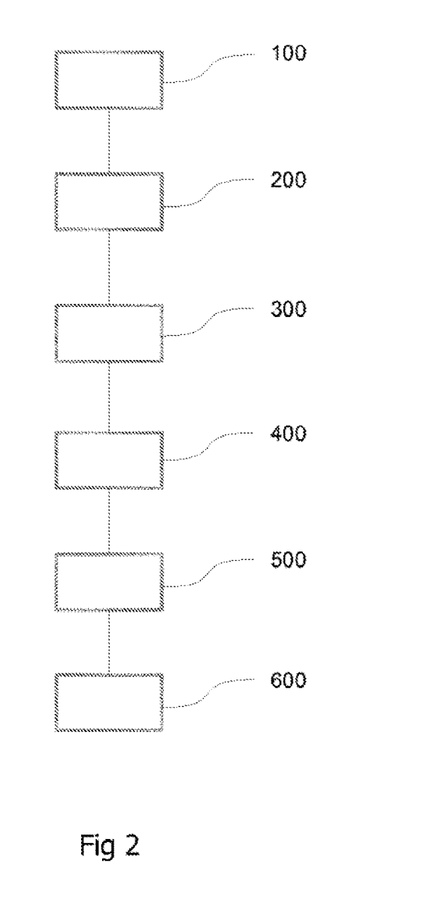
FIG. 2: a representation of one preferred mode of implementation of the method of FIG. 1 in which the method includes a step of verifying that at least one cumulative constraint imposed on said spacecraft is respected.

FIG. 2 shows one preferred mode of implementation of the method of FIG. 1 in which the method includes, subsequent to step 500, a step 600 of verifying that at least one cumulative constraint imposed on said satellite is respected.

A cumulative constraint imposed on the satellite is a constraint that takes into account the set of choices made when planning the observation mission before the satellite reaches a discrete acquisition opportunity on its orbit. Stated otherwise, and unlike the kinematic local constraints associated with each of the discrete acquisition opportunities, a cumulative constraint has global nature relative to the mission history of the satellite.

For example, and completely non-limitingly, said at least one cumulative constraint includes a memory size constraint. Specifically, on an observation mission, the satellite stores, in a digital format, the acquisitions that it makes in a memory of a type known per se and of limited size.

Alternatively or in addition to step 600, said at least one cumulative constraint includes a consumed electrical power constraint. Specifically, on an observation mission, the satellite consumes electrical energy stored in batteries of limited respective capacity in order to move. The same applies for the operation of the optical system of the satellite. It should be noted that said batteries are rechargeable, generally by means of solar panels.

Alternatively or in addition to step 600, said at least one cumulative constraint includes a maximum operating time constraint for instruments on board said craft.

According to other examples (not shown here), there is nothing to rule out other cumulative constraints applying to the satellite.

Verifying said at least one cumulative constraint consists in checking that the optimum acquisition sequence obtained as output of step 500 is compatible with the general operation of the satellite. To achieve this, this verification operation is implemented in step 600 by means, for example, of an iterative process consisting in removing the discrete acquisition opportunities from said optimum sequence one at a time in order of increasing priority until said at least one cumulative constraint is met. In this way, the method produces, as output of step 600, a sequence that is a subsequence of the optimum sequence obtained as output of step 500, and that is compatible with the cumulative constraints associated with the satellite. This sequence obtained as output of step 600 is the acquisition plan that is actually followed by the satellite over the course of its mission.

Figure 3:
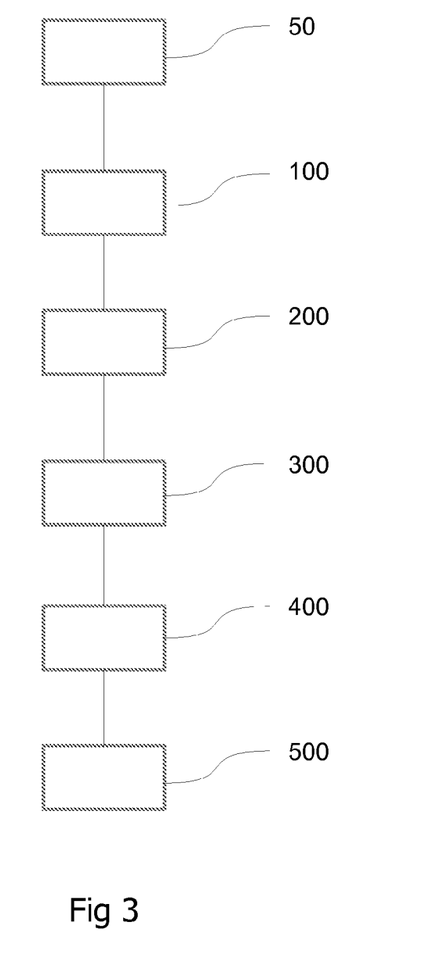
FIG. 3: a representation of one particular mode of implementation of the method of FIG. 1 in which the method includes a step of aggregating terrestrial areas.

FIG. 3 shows one particular mode of implementation of the method of FIG. 1 in which the method may include a step 50 of aggregating terrestrial areas, prior to the step 100 of determining discrete acquisition opportunities.

The term "aggregating terrestrial areas" is understood here to mean grouping together certain terrestrial areas $Z_1, \ldots, Z_N$ within one or more areas that are referred to as overall areas, said grouped areas necessarily being geographically close to one another, so as to maximize the number of areas that are acquired in one and the same discrete acquisition opportunity.

For example, an overall area may contain multiple terrestrial areas that are aligned in the direction of acquisition of the satellite along its orbit.

In another example, potentially in conjunction with the preceding example, an overall area may contain multiple terrestrial areas that are aligned in a direction that is transverse to the orbit of the satellite. In this case, the size of said overall area is bounded by the size of the imaging swath of the satellite.

In the implementation of step 50, each overall area is for example associated with a priority that is equal to the highest priority among the priorities of all of the areas grouped together within said overall area. In addition, the quality criterion of an overall area is for example equal to the sum of the respective quality criteria of the areas grouped together within said overall area.

Upon completion of step 50, each overall area is seen as a terrestrial area in its own right such that steps 100 and 600 are not modified.

It should be noted that grouping together terrestrial areas within overall areas makes sense when multiple terrestrial areas are contiguous, so that they can all be acquired at one and the same time. Proceeding in such a manner is advantageous since it allows the satellite to save maneuvering time that would otherwise be required to move between the respective discrete acquisition opportunities associated with each of said grouped terrestrial areas. Time saved in this way may advantageously be used to acquire more terrestrial areas that cannot themselves be grouped together within overall areas.

Figure 4:
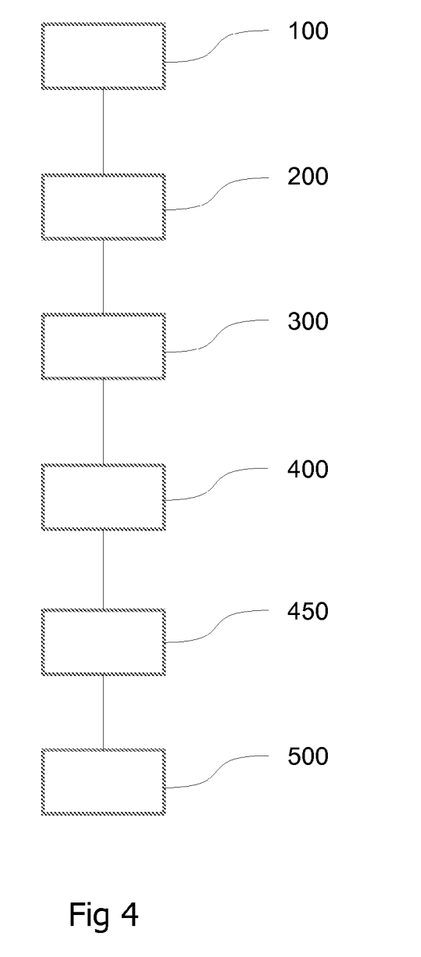
FIG. 4: a representation of one preferred mode of implementation of the method of FIG. 1 in which the terrestrial areas that have to be acquired a single time or else a plurality of times is taken into account.

FIG. 4 shows one preferred mode of implementation of the method of FIG. 1 in which the step 500 of determining an optimum sequence advantageously includes dynamically updating a variable pathMesh storing the areas $Z_i$ that are associated with the discrete acquisition opportunities of said optimum sequence, so as to prevent the duplication of discrete acquisition opportunities for areas having to be acquired a single time.

For this purpose, mesh($D^i$) denoting a function that returns the terrestrial area with which the discrete acquisition opportunity $D^i$ is associated, the first algorithm is rewritten as follows:

```
For i ranging from 1 to Ω(D): obj(D^i) = c[D^i] EndFor;
For i ranging from 1 to Ω(D): previous(D^i) = -1 EndFor;
For i ranging from 1 to Ω(D):
    For j = (i+1) ... maxNextVertex(D^i):
        If M^{i,j} = 1:
            If obj(D^i) + c[D^j] > obj(D^j):
                If mesh(D^j) ∉ pathMesh(D^i);
                    previous(D^j) = D^i;
                    obj(D^j) = obj(D^i) + c[D^j];
                    pathMesh(D^j) = {pathMesh(D^i) mesh(D^j)};
                EndIf;
            EndIf;
        EndIf;
    EndFor;
EndFor;
```

By storing, in the variable pathMesh, the history of the terrestrial areas visited when determining the optimum sequence, the method is advantageously able to avoid a terrestrial area $Z_i$ that has a high quality criterion, is associated with a high priority request and has to be acquired a single time, ultimately being acquired a plurality of times. Specifically, assuming that such a zone $Z_i$ is associated with multiple discrete acquisition opportunities that are kinematically compatible with one another, and since the longest path computing method seeks to maximize the weight of the optimum sequence, it is entirely possible for multiple said discrete acquisition opportunities associated with $Z_i$ to be included in said optimum sequence. It is therefore advantageous to introduce the variable pathMesh such as explained above in order to identify this type of configuration.

The features described above make it possible to obtain an optimum sequence guaranteeing a single imaging operation for each terrestrial area that is associated with a single-view request. The case of terrestrial areas associated with stereo/tri-stereo requests then also remains to be considered.

For this reason, in said preferred mode of implementation illustrated by FIG. 4, the method also includes a step 450 of taking multiple acquisition requests into account, subsequent to the step 400 of evaluating the kinematic compatibility and prior to the step 500 of determining an optimum sequence, wherein the respective weights of the discrete acquisition opportunities that are associated with areas $Z_i$ having to be acquired a plurality of times are updated and wherein a variable mustHit forces the chaining of said discrete acquisition opportunities to fulfill said multiple acquisition requests.

It should be noted that the discrete acquisition opportunities that are associated with an area $Z_i$ having to be acquired a plurality of times belong to the same visual accessibility time period $T_i$ and are furthermore separate from one another. Said opportunities therefore have different start dates and thus allow for example said area $Z_i$ to be acquired at a different angle.

The general principle of step 450 consists in artificially increasing the weight of the discrete acquisition opportunities that are associated with areas $Z_i$ having to be acquired in stereo mode or in tri-stereo mode twofold or threefold, respectively. It is furthermore understood that the agility of the satellite makes it possible to envisage fulfilling single-view requests between acquisition opportunities associated with areas $Z_i$ having to be acquired multiple times.

To achieve this, in a first stage, for each request corresponding to a request for multiple acquisitions, the set of kinematically compatible acquisition sequences, comprising exactly the number of acquisitions required to fulfil said request (this number is 2 and 3 in the case of stereo and of tri-stereo, respectively) is determined, potentially along with discrete acquisition opportunities that are associated with other single-view requests such as mentioned above. Such a sequence is referred to as a multi-acquisition sequence and is constructed such that its first and last elements are discrete acquisition opportunities that belong to one and the same terrestrial area and are associated with the request on which said multi-acquisition sequence depends. Stated otherwise, said first and last elements are not associated with single-view requests.

In a second stage, for each multi-acquisition sequence such as determined above:

a chaining criterion is determined. Said chaining criterion is a scalar that corresponds to a measurement of the advantage of fulfilling the request with which said multi-acquisition sequence is actually associated according to said multi-acquisition sequence rather than another. The chaining criterion is therefore a scale for comparing the multi-acquisition sequences that are associated with one and the same request, a chaining weight is determined. In one particular mode of implementation, said chaining weight depends on the priority of the request, on the quality criterion $w[Z_i]$ of the area $Z_i$ associated with said request and on said chaining criterion. For example, said chaining criterion is taken into account in the chaining weight by adding said chaining criterion to the quality criterion $w[Z_i]$ in the same way as described in step 100 in relation to using the acquisition advantage criterion $w[a_i^j]$. Consequently, the chaining weight of the multi-acquisition sequence is a vector having a single non-zero component, the graph G is updated according to a graph $G_{multi}$. On the one hand, the graph $G_{multi}$ includes vertices corresponding to the respective discrete acquisition opportunities that are associated with respective single-view requests and that have a respective weight such as determined in step 100. On the other hand, the graph $G_{multi}$ includes vertices corresponding to each discrete acquisition opportunity, respectively, of said multi-acquisition sequence and all having a weight of zero, except the vertex that is associated with the first component of said sequence, the weight of which is equal to the chaining weight, a variable mustHit is created, which associates, with each discrete acquisition opportunity of said multi-acquisition sequence, the discrete acquisition opportunity that comes after it in time within said multi-acquisition sequence. For example, and completely nonlimitingly, if said multi-acquisition sequence is associated with a tri-stereo request for an area $Z_i$ and is written $(a_i^1, a_i^2, a_i^3)$, then mustHit$(a_i^2)=a_i^2$ and mustHit$(a_i^2)=a_i^3$. In another example, and completely nonlimitingly, if said multi-acquisition sequence is associated with a tri-stereo request for an area $Z_i$ and is written $(a_i^1, a_i^2, a_j^1, a_i^3)$, where $a_j^1$ is an opportunity associated with a single-view request for an area $Z_j$ that is different from $Z_i$, then mustHit$(a_i^1)=a_i^2$, mustHit$(a_i^2)=a_j^1$ and mustHit$(a_j^1)=a_i^3$.

It should be noted that in the case in which a request corresponding to a request for multiple acquisitions is associated with multiple possible multi-acquisition sequences, the graph $G_{multi}$ includes vertices corresponding to discrete acquisition opportunities that are identical in terms of start date, but nevertheless differ from one another in terms of weight. For example, and completely nonlimitingly, suppose that a stereo request is associated with an accessibility period that is discretized according to four discrete acquisition opportunities $(a_i^1, a_i^2, a_i^3, a_i^4)$ such that only the multi-acquisition sequences $(a_i^1, a_i^3)$ and $(a_i^1, a_i^4)$ are kinematically compatible and suitable for fulfilling said request. Then the vertex $a_i^1$ will appear twice in the graph $G_{multi}$, namely a first time with a weight that is equal to the chaining weight of the sequence $(a_i^1, a_i^3)$ and such that mustHit$(a_i^1)=a_i^3$, and a second time with a weight that is equal to the chaining weight of the sequence $(a_i^1, a_i^4)$ and such that mustHit$(a_i^1)=a_i^4$. The vertices $a_i^2, a_i^3$ and $a_i^4$ themselves appear only once in the graph $G_{multi}$ and have a weight of zero.

The graph $G_{multi}$ is represented by means of a matrix $M_{multi}$ according to one mode of implementation that is identical to that used to represent the graph G by means of the matrix M in step 400. It is therefore understood, due to the fact that certain discrete acquisition opportunities may appear multiple times in the graph $G_{multi}$ such as described above, that said matrix $M_{multi}$ is larger than the matrix M. Additionally, the graph $G_{multi}$ is that used in step 500 of searching for an optimum sequence when the set of requests transmitted to the satellite includes at least one request for multiple acquisitions.

Furthermore, the variable mustHit is also able to force the execution of a multi-acquisition sequence once the first element of this sequence is actually incorporated within the optimum sequence in step 500. Proceeding in such a manner is advantageous since it allows the method to take into account, in their entirety, the requests that are associated with requests for multiple acquisitions without however favoring these requests to the detriment of the single-view requests including discrete acquisition opportunities having respective weights that are greater than the opportunities that comprise said requests for multiple acquisitions.

The variable mustHit is also advantageously used when computing the longest path in step 500 to verify that, when a discrete acquisition opportunity is added to the optimum sequence that is under construction, this discrete acquisition opportunity is indeed stored in the variable mustHit that is applied to the elements of the optimum sequence preceding said added opportunity.

In the case of a constellation of satellites, it is advantageous to be able to respond rapidly to a client if a request may be carried out and within which timeframe. In this case the method may be:

a) receiving the request from the client;

b) identifying the next satellite that can perform this acquisition, without taking into account the current acquisition plan of this satellite;

c) generating a new plan for said satellite with the following constraints:

c1. all of the acquisitions that have been programmed into the current plan must remain so (unless it is accepted to cancel planned acquisitions), however their acquisition conditions may change.

c2. inserting the new request d) depending on the result of the optimization operation:

d1. if the acquisition is included in the new plan then the modified plan is transmitted to the satellite d2. otherwise it is reiterated on the next satellite.

It is not necessary to accept new client requests one at a time; this may be done periodically, for example every 5 minutes. By means of a suitable choice of priorities, it is possible to force the new request to be taken into account.

By virtue of its rapidity, the plan may be computed frequently. In addition, updating the solution is less expensive than a complete computation on the basis of the results of the preceding computation, and in particular the matrix M representing the graph obtained upon completion of step 400 or the graph $G_{multi}$ associated with the matrix $M_{multi}$ upon completion of step 450.

Thus, it is possible to minimize the computing time for the steps prior to step 500, which are the most intensive in terms of computing time.

The invention claimed is:

1. A method for planning an acquisition of images of terrestrial areas $Z_1, \ldots, Z_N$ by a spacecraft on a mission around the Earth following a predetermined traveling orbit, each terrestrial area $Z_i$ being associated with a request $R_i$ of priority $p_i$ such that the terrestrial area $Z_i$ corresponds to a visual accessibility time period $T_i$ along said predetermined traveling orbit, comprising following successive steps:
  determining, for each period $T_i$, discrete acquisition opportunities for the terrestrial area $Z_i$ such that a start date included in said period $T_i$, a duration of execution, a kinematic local constraint and a weight are associated with each discrete acquisition opportunity;
  grouping together the discrete acquisition opportunities of the terrestrial area $Z_i$ into a set D;
  ranking the discrete acquisition opportunities of the set D, the discrete acquisition opportunities being ranked in order of increasing start date and denoted by $D^i$;
  evaluating a kinematic compatibility between the discrete acquisition opportunities of the set D, taken pairwise according to their respective rankings; and
  determining an optimum sequence of discrete acquisition opportunities having a maximum weight, and being kinematically compatible.

2. The method according to claim 1, further comprising a step of taking multiple acquisition requests into account, subsequent to the step of evaluating the kinematic compatibility and prior to the step of determining an optimum sequence, wherein the respective weights of the discrete acquisition opportunities associated with the terrestrial area $Z_i$ to be acquired a plurality of times are updated and wherein a variable forces chaining of the discrete acquisition opportunities to fulfill said multiple acquisition requests.

3. The method according to claim 1, wherein the step of determining an optimum sequence comprises a step of dynamically updating a variable storing the terrestrial area $Z_i$ associated with the discrete acquisition opportunities of the optimum sequence, so as to prevent duplication of discrete acquisition opportunities for areas to be acquired once.

4. The method according to claim 1, wherein the step of determining an optimal sequence comprises, for each discrete acquisition opportunity $D^i$ of the set D, a partial selection of the discrete acquisition opportunities that are kinematically compatible with the discrete acquisition opportunity $D^i$ and preceding the discrete acquisition opportunity $D^i$ in the set D, from all of the discrete acquisition opportunities that are kinematically compatible with the discrete acquisition opportunity $D^i$ and preceding the discrete acquisition opportunity $D^i$ in the set D.

5. The method according to claim 1, further comprising a step of verifying that at least one cumulative constraint imposed on said spacecraft is met, the step of verifying being subsequent to the step of determining an optimum sequence.

6. The method according to claim 5, wherein said at least one cumulative constraint comprises a memory size constraint.

7. The method according to claim 5, wherein said at least one cumulative constraint comprises a consumed electrical power constraint.

8. The method according to claim 5, wherein said at least one cumulative constraint comprises a maximum operating time constraint for instruments on board said spacecraft.

9. The method according to claim 5, wherein the step of verifying comprises dynamically updating said optimum sequence by removing the discrete acquisition opportunities until said at least one cumulative constraint is met.

10. The method according to claim 1, wherein the start dates of the discrete acquisition opportunities of each period $T_i$ are sampled over time according to a constant time interval.

11. The method according to claim 10, wherein respective constant time intervals of the periods $T_1, \ldots, T_N$ are equal to one another.

12. The method according to claim 10, wherein respective constant time intervals of at least two periods $T_i$ and $T_j$ are different.

13. The method according to claim 10, wherein the constant time interval of each period $T_i$ is adjusted such that said each period $T_i$ is associated with twenty discrete acquisition opportunities.

14. The method according to claim 1, wherein the kinematic local constraint of a discrete acquisition opportunity comprises a setpoint for an attitude of said spacecraft at a start and at an end of said discrete acquisition opportunity.

15. The method according to claim 1, wherein the weight of said each discrete acquisition opportunity associated with the terrestrial area $Z_i$ depends on the priority $p_i$ of the request $R_i$ associated with the terrestrial area $Z_i$.

16. The method according to claim 1, wherein the terrestrial area $Z_i$ is associated with a quality criterion that is dependent on geometric features of the terrestrial area Zi and on meteorological conditions forecasted for the visual accessibility time period Ti.

17. The method according to claim 16, wherein the weight of each discrete acquisition opportunity associated with the terrestrial area $Z_i$ depends on the priority $p_i$ of the request $R_i$ so as to be a vector, a sole non-zero component of the vector is equal to the quality criterion, and a position of said sole non-zero component of said vector depends on the priority $p_i$ of said request $R_i$.

18. The method according to claim 17, wherein said sole non-zero component depends on the quality criterion and on an acquisition advantage criterion associated with said each discrete acquisition opportunity.

19. The method according to claim 17, wherein the step of determining an optimum sequence comprises comparing respective weights of the discrete acquisition opportunities that are kinematically compatible with one another.

20. The method according to claim 1, further comprises a step of aggregating terrestrial areas prior to the step of determining discrete acquisition opportunities.

21. The method according to claim 1, wherein said spacecraft is an observation satellite operating in pushbroom mode.

* * * * *